United States Patent [19]

Sälzle

[11] 4,332,649

[45] Jun. 1, 1982

[54] METHOD OF POLISHING GLASS WARE WITH SULFURIC ACID AND HYDROFLUORIC ACID

[76] Inventor: Erich Sälzle, Nadistrasse 8, 8000 Müchen 40, Fed. Rep. of Germany

[21] Appl. No.: 208,452

[22] Filed: Nov. 19, 1980

[30] Foreign Application Priority Data

Dec. 7, 1979 [DE] Fed. Rep. of Germany ....... 2949383

[51] Int. Cl.³ ................................................. C25B 1/16
[52] U.S. Cl. ........................................ 204/98; 204/99; 204/125; 204/180 P; 204/130; 156/663; 210/660; 422/50
[58] Field of Search ................... 156/663, 636; 422/50; 204/1 T, 180 P, 98, 99, 125, 130; 210/660

[56] References Cited

U.S. PATENT DOCUMENTS 3,321,388  5/1967  Ueda et al. ............................ 204/98
3,560,281  2/1971  Nelson ................................. 156/663

FOREIGN PATENT DOCUMENTS 166783  9/1953  Australia ............................. 156/663
1189681  3/1965  Fed. Rep. of Germany ...... 156/663

Primary Examiner—R. L. Andrews
Attorney, Agent, or Firm—Karl W. Flocks; Sheridan Neimark

[57] ABSTRACT

The invention relates to a polishing method for pressed glass or ground glass articles. As is conventional, polishing is effected in a bath containing sulfuric acid and hydrofluoric acid. Rinsing with a sulfuric acid and/or water washing bath intervenes and follows the polishing process. According to the method of the invention, the sodium and/or potassium ions resulting from the dissolution of glass constituents are removed from the polishing bath by the following means:

(a) by adding fluorosilicic acid to the polishing bath, precipitating the corresponding silicofluorides and filtering off the solid matter,
(b) by electrolysis in a mercury cell with the formation of sodium- and/or potassium amalgam,
(c) by electrolysis in a cell having a cation semi-permeable membrane or
(d) with the aid of cation exchangers.

20 Claims, No Drawings

METHOD OF POLISHING GLASS WARE WITH SULFURIC ACID AND HYDROFLUORIC ACID

The method according to the invention is employed in the glass industry, wherein the surfaces of crude, pressed or ground articles are polished to give them the necessary gloss or polish.

It is known that glass articles—both pressed glass and ground glass articles—are polished by chemical means, implemented by a polishing bath containing hydrofluoric acid and sulfuric acid. Due to the reactions with the glass constituents of the surface of the articles, as take place during the acid polishing, a firmly adherent layer of reaction products is formed thereon. These reaction products are generally sulfates, bisulfates, fluorides and silicofluorides of the cations contained in the glasses. This layer of reaction products checks the polishing process, that is, such layer progressively reduces the action of the polishing acids on the glass surface until the reactions come completely to a standstill. Heretofore it was hence always necessary that the layer formed by reaction products of the polishing process be removed from the glass surface in order to be able to continue polishing. To that end the polishing was interrupted, the coating was washed off and this was repeated many times until the desired degree of polish was achieved. Earlier, water was used to wash off the polish deposit but this gave rise to great drawbacks because, owing to the alternate polishing and washing, large quantities of water are introduced into and dilute the polishing bath. On the other hand, washings are produced having an acidity entailing not only undue acid consumption but also grave problems due to these acidic washings having to be neutralised in an elaborate manner before they can be discharged into rivers.

The frequent transfer of the baskets loaded with the glass ware to be polished, from the polishing bath into the sulfuric acid bath and back and then finally into the last water bath before drying, not only requires a great deal of time but also a great deal of handling and is therefore very labour-intensive and costly.

According to German Patent Specification No. 11 85 780, a sulfuric acid solution of such a concentration as to be dehydrating was employed as a washing bath, so that only the finally polished articles had to be rinsed with water. However, this polishing method using a sulfuric acid washing bath also necessitated that the glass articles to be polished be repeatedly immersed, i.e. some 10 to 15 times, in the polishing bath and in the washing bath, alternately, for relatively short immersion times.

It is known from German Auslegeschrift No. 14 96 666 that the polishing bath be maintained under the saturation concentration for fluorosilicic acid by discharging and discarding a part of the polishing bath and replacing the same volume proportion by fresh polishing acid or by correspondingly increasing the hydrogen fluoride content of the polishing acid by introducing gaseous hydrogen fluoride. However, it is neither aimed at nor achieved that solute sodium and potassium ions be removed from the polishing acid in this manner.

It is the object of the invention to fully or largely avoid this multiple alternating treatment in a polishing and washing bath or, in other words, to provide a method permitting the desired degree of polish to be achieved in a single or in at most two or three immersion step.

According to the invention this object is met by removing sodium and/or potassium ions from the polishing bath during its operation.

It has surprisingly been found that removing sodium and/or potassium ions from the polishing bath can considerably prolong the polishing time with a single immersion, i.e. the alternating treatment can be restricted to a few times, or can even enable the desired surface finish to be achieved with a single polishing and washing step.

As is conventional, a polishing bath containing both sulfuric acid and hydrofluoric acid is used for the method according to the invention. Polishing is mostly carried out at an elevated temperature up to about 70° C., preferably between 40° and 60° C., depending on the composition of the polishing bath. Generally the sulfuric acid concentration in the polishing bath is between 52 and 63% $H_2SO_4$ or greater, and the HF concentration is between 3 and 10%. The exact composition and temperature of the polishing acid largely depends on the composition of the glass of which the articles to be polished are made.

As already mentioned above, in order to reduce the number of immersions of the articles to be polished in the polishing bath and to reduce the respective immersion time, it has proven expedient that the deposit—which forms on the articles to be polished during the polishing process due to the polishing reaction—be washed off not by water but by a sulfuric acid washing bath. The concentration of sulfuric acid in such a washing bath is to be so high that it has a dehydrating effect, i.e. more than 67% $H_2SO_4$, thus causing the formed salt deposit to become porous, crumbly and to break off. This is due to the sulfuric acid extracting the water content of the salts and thereby being capable of substantially changing the structure of the deposit. Consequently, it is expedient to use a sulfuric acid of a concentration of 68 to about 72% $H_2SO_4$. The sulfuric acid washing bath is also to have an elevated temperature, a temperature of between 55° and 65° C. preferably being maintained.

When the desired degree of polish is achieved after a certain number of alternating treatments, i.e. immersion in the polishing bath and removing the formerly formed deposit in the sulfuric acid washing bath, the finally polished ware is lastly washed free of acid using water and is dried.

The surface glass constituents are removed during the polishing process in the sulfuric acid containing hydrofluoric acid polishing bath. In so doing, the alkali ions first dissolve, but after saturation of the polishing bath by such alkali ions, they begin to deposit as bisulfates together with fluorides and silicofluorides in the form of a precipitate firmly adhering to the glass surfaces. But if the alkali ions are instead removed from the polishing bath in some manner, the polishing bath is then able to keep alkali ions from the glass constituents in solution, thus repressing and delaying the precipitation of the alkali bisulfates. The precipitations of fluorides and silicofluorides from the polishing reaction which still occur, in some cases with a certain portion of sulfates, are however no longer firmly adherent—like the former layers containing a large volume of alkali bisulfates—and can generally be rinsed off by moving the glass articles within the polishing bath.

In accordance with the invention, the removal of sodium ions and/or potassium ions from the polishing bath can take place in different ways. The precipitation with fluorosilic acid is particularly advantageous because the sodium- and potassium silicofluorides are only slightly soluble in the polishing bath. The precipitation with fluorosilicic acid can take place continuously, batch-wise or intermittently. The precipitated silicofluorides are then separated from the polishing bath by means of the polishing bath being circulated by pumping through a filter. The type of filter used for this is immaterial. Common suction filters or rotary filters and filter presses may be used. The filter cake, i.e. the precipitated alkali silicofluorides, can be made further use of, while the filtrate, i.e. the purified polishing bath, is recycled into the polishing vessel. The amount of fluorosilicic acid to be used depends on the total amount of sodium and potassium ions in the volume of the polishing bath to be precipitated. This quantity of fluorosilicic acid is simply calculated from the saturation concentrations of sodium and/or potassium in the form of their bisulfates, fluorides or silicofluorides, or can be determined by simple preliminary tests.

This precipitation of the alkali silicofluorides is promoted by a small admixture of phosphoric acid and/or acetic acid to the polishing bath.

It is also possible to add small amounts of complexing organic acids such as oxalic acid, tartaric acid or malonic acid to the polishing bath. Thereby more alkali ions in the polishing bath can be maintained in solution and consequently the precipitation can be effected with smaller quantities of fluorosilicic acid and at greater intervals, respectively. Apart from the above-stated complexing acids, other chelating agents for sodium and potassium are also suitable provided that they are capable of withstanding the strongly acidic medium. Examples of these are 1,2,3-triaminopropane, alanine, glycine, amino-barbituric acid-N,N-diacetic acid, nitrilotriacetic acid, 2-sulfoaniline diacetic acid, ethylene diamine tetraacetic acid, as well as the various condensed phosphoric acids such as pyrophosphoric acid, tetramethaphosphoric acid, trimethaphosphoric acid, tripolyphosphoric acid and further substances acting on the same principle.

A further possibility of removing the alkali ions from the polishing bath consists in conducting the polishing bath in a bypass or intermittently through a mercury electrolytic cell wherein the mercury cathode takes up sodium and potassium by formation of amalgams. The amalgam is processed as usual. The alkali metals, sodium and/or potassium deposited in the mercury cathode under the high hydrogen overvoltage, dissolve in the mercury and form liquid amalgams. The latter are treated in a conventional manner with water in a decomposer, whereby an alkali hydroxide solution and hydrogen are produced and the mercury is regenerated for electrolysis.

The electrolytic or electrodialytic removal of the alkali ions from the polishing bath is also possible in a membrane electrolytic cell, the alkali ions migrating from the polishing bath through a semi-permeable membrane into the catholyte. For such electrolytic or electrodialytic methods, membranes are used made of a material which is selectively permeable only for cations, i.e. in this case for sodium and/or potassium. Cation exchange membranes are generally known in technology for electrolysis and electrodialysis. The exchanger material may be, by way of example, a resin on the basis of phenol formaldehyde with pendent sulfonic acid groups or may also be the known exchanger materials on the basis of a styrene resin with sulfonic acid exchanger groups, corresponding to the commercial products "Amberlite" and "Dowex", the latter probably being the best known ones. Acrylic acid resins with the carboxylic acid group as exchanger group and vinyl resins with sulfonic acid exchanger group are also suitable. Finally, the newly developed perfluorated homopolymers and copolymers of the ethylene with pendent sulfonic and carboxylic acid groups and similarly effective substances are also suitable. As the catholyte, a sulfuric acid solution is by way of example suitable, from which the alkali sulfate is then crystallized out and the acid is recycled for polishing or can be put to some other use.

Finally, it is also possible to remove the alkali ions from the polishing bath by means of ion exchangers. These may be polymer products in the acid of hydrogen form or zeolitic molecular sieves or the like. The ion exchanger materials are in this case kept in a column and the polishing bath to be freed of the alkali ions is passed through this bed of ion exchangers. The ion exchangers capture the alkali ions and the regenerated polishing bath can then be recycled into the polishing vessel. Products as were already enumerated above for the membrane materials are suitable as organic polymer cation exchangers. In addition, inorganic ion exchanging substances such as permutites and zeolites are suitable, these being alumino-silicates of varied composition which are capable of exchanging their cationic parts against sodium or potassium or function in the manner of molecular sieves, i.e. they do not allow the cations to pass through their skeleton-like molecular structure.

A further advantage of the method according to the invention resides in that the sulfuric acid concentration in the polishing bath need not be strictly maintained—as heretofore—between 50 and 60% $H_2SO_4$, but the sulfuric acid content may be between 40 and 75% thereby facilitating the polishing operation and enabling the sulfuric acid consumption to be reduced.

The fluorosilicic acid required for the first method variant can be produced on the spot. As is known, silicon tetrafluoride is produced during the polishing process, which escapes from the polishing bath together with hydrogen fluoride, is drawn off therefrom and is taken up in water in a gas scrubbing; the fluorosilicic acid thus formed—optionally and alternatively after concentration to the desired value—can now be used to precipitate the alkali ions. Thereby the necessity of neutralising the washings from the gas scrubbing is also eliminated and the hydrofluoric acid spent in the polishing process is made available as a precipitating agent.

In conclusion, the precipitation of the alkalis renders it possible to monitor and control the composition of the polishing bath in a simple and reliable manner. On condition that the density of the polishing bath is kept constant, the hydrofluoric acid concentration in the polishing bath can be determined by conductivity measurements (accuracy $\pm 10\%$) and the conductivity can be used as a control unit for replenishing the polishing bath with hydrofluoric acid. An automatic control of the polishing process can be built up on this principle. In this automatic control of the polishing process on condition of constant density of the polishing bath by preserving a substantially constant composition, the conductivity of the polishing bath is either continuously recorded in a conventional manner, or the conductivity is intermittently determined. If the conductivity of the polishing bath now reaches a certain limiting value corresponding to a certain limiting concentration of the hydrofluoric acid within the bath, the supply of hydrofluoric acid is automatically initiated until such time as the concentration of hydrofluoric acid in the polishing bath and thus the conductivity thereof has reached a second limiting value.

The invention will be illustrated in detail by means of the following examples.

EXAMPLE 1

Glass articles of lead crystal having approx. 30% PbO were to be polished. The polishing bath was a solution of 45% by weight $H_2SO_4$ and 2.5% by weight HF and had a temperature of about 50° C. $H_2SiF_6$ of a concentration of 35% was continuously added to the polishing bath in an amount sufficient to correspond to the alkali content of the glass constituents dissolved during the polishing. The excess of fluorosilicic acid should not exceed 1%. Rinsing was effected in sulfuric acid of a concentration of 66 to 76% and having a temperature of about 70° C. It was necessary to repeat the alternating treatment only three times and the whole polishing process was concluded in 12 minutes.

EXAMPLE 2

Pressed plates of lead crystal having 24% PbO were to be polished. The polishing bath contained 65% by weight $H_2SO_4$ and 6% by weight HF and had a temperature of 55° C. The polishing process was concluded after 10 minutes. After three batches, fluorosilicic acid was added to the polishing bath in an amount sufficient for there to be a 0.5% excess of $H_2SiF_6$. The precipitated sodium- and/or potassium silicofluorides were separated from the polishing bath at the end of each batch.

EXAMPLE 3

Goblets of lead crystal having 24% PbO and a very rough diamond cut were to be polished. The polishing bath contained 45% by weight $H_2SO_4$, 0.8% by weight HF and 1% by volume $H_3PO_4$ (of a 85% concentration). The polishing process was completed in 14 minutes by one immersion. After three batches, the precipitation of the alkali silicofluorides with fluorosilicic acid took place.

EXAMPLE 4

Pressed glass bowls were to be polished. The polishing bath contained 55% by weight $H_2SO_4$, 2.5% by weight HF and 0.3% by volume $H_3PO_4$. Sulfuric acid of a concentration of 75% and having a temperature of 75° C. served as the washing bath. The desired degree of polish was reached in two immersions in the polishing bath and washing bath after a total time of 9 minutes. The precipitation of the alkali silicofluorides took place by continuously maintaining a small excess of the required fluorosilicic acid in the polishing bath.

EXAMPLE 5

Whisky tumblers having a diamond cut were to be polished. The polishing bath contained 65% by weight $H_2SO_4$, 1.8% by weight HF and 0.4% by weight tartaric acid and had a temperature of 50° C. The required degree of polish was achieved in a single immersion of 18 minutes. After 10 batches, the silico fluorides were precipitated by the addition of fluorosilicic acid and were separated from the polishing bath.

EXAMPLE 6

Small pressed vessels of lead crystal having 24% PbO were to be polished. The polishing bath contained 70% by weight $H_2SO_4$, 3% by weight HF and 0.3% by weight oxalic acid and had a temperature of 60° C. The desired degree of polish was reached in 12 minutes after a single immersion. After 10 to 15 batches, the silicofluorides of the alkalis were precipitated and separated from the polishing bath by means of fluorosilicic acid.

EXAMPLE 7

Hand cut bowls of lead crystal having 24% PbO were to be polished. The polishing bath contained 70% by weight $H_2SO_4$ and 6% HF and had a temperature of 55° C. A sulfuric acid solution of a concentration of 75% and having a temperature of 75° C. served as the washing bath. After repeating the immersion and washing treatment twice, the desired degree of polish was reached after a total time of 8 minutes. The polishing bath was intermittently supplied to a mercury electrolytic cell, was freed therein from the dissolved alkalis and was recycled for polishing the next batch.

EXAMPLE 8

Wine glasses were to be polished in a polishing bath containing 65% by weight $H_2SO_4$ and 1.5% HF at a temperature of 45° C. The polishing bath was continuously circulated by pumping from the polishing vessel, through the electrolytic cell and back to the polishing vessel. The electrolytic cell contained between the electrode chambers a semi-permeable membrane which only allowed the passage of the alkali ions. The polishing bath was introduced into the anode chamber and a sulfuric acid solution was used as the catholyte. Due to the electrolysis, the alkali ions migrated from the anode chamber into the cathode chamber and there formed alkali sulfate. When the saturation concentration of the sulfates was reached in the catholyte, the same were cooled and crystallized out. By means of this electrolysis, the alkali concentration in the polishing bath could be kept constant for a long duration. In the case of this method, a polishing time of 15 minutes was required. In the polishing bath having constant density, the conductivity can be used as control unit for feeding hydrofluoric acid into the polishing bath.

EXAMPLE 9

Vases of lead crystal having 30% PbO, which were obtained by centrifugal casting and were ground, were polished in a polishing bath containing 45% by weight $H_2SO_4$ and 1.5% by weight HF at a temperature of 50° C. Polishing bath was continuously conducted from the polishing vessel, through a primary filter and into a column by way of a bypass. The said column contained a zeolite in the $H^+$ form as a cation exchanger. After the alkali ions were removed from the polishing bath, the latter was returned to the polishing vessel. The glass articles were polished within 8 minutes in three alternating treatments with the use of a sulfuric acid washing bath. A cation exchanger with sulfonic acid groups proved to be serviceable in the column in the same way. After some time the ion exchanger can be regenerated in the conventional way.

I claim:

1. A method of polishing glass articles comprising contacting said articles with a polishing bath containing sulfuric acid and hydrofluoric acid and subsequently rinsing the finally polished articles in a sulfuric acid washing bath and/or water washing bath, wherein during the polishing operation dissolved alkali metal ions selected from the group consisting of sodium and potassium are removed from the polishing bath.

2. The method according to claim 1, wherein the alkali metal ions are continuously removed from the polishing bath.

3. The method according to claim 1, wherein the alkali metal ions are removed batch-wise from the polishing bath.

4. The method according to claim 1, wherein the alkali metal ions are removed intermittently from the polishing bath.

5. The method according to claim 1, wherein the removal of the alkali metal ions is achieved by adding to the polishing bath an amount sufficient of fluorosilicic acid to effect precipitation in said polishing bath of said sodium and potassium ions as sodium- and potassium-silicofluoride, without substantial excess, and separating the precipitated alkali silicofluorides.

6. The method according to claim 5, wherein an acid selected from the group consisting of phosphoric acid and acetic acid is added to the polishing bath.

7. The method according to claim 5, wherein an organic acid selected from the group consisting of malonic acid, oxalic acid and tartaric acid is added to the polishing bath.

8. The method according to claim 5, wherein an acid is added to the polishing bath selected from the group consisting of phosphoric acid, acetic acid and malonic acid, oxalic acid and tartaric acid.

9. The method according to claim 1, wherein the alkali metal ions are removed by electrolysis in a mercury cell.

10. The method according to claim 1, wherein the alkali ions are removed in an electrolytic cell whose electrodes are separated by a cation semi-permeable membrane.

11. The method according to claim 1, wherein the alkali metal ions are removed by means of a cation exchanger.

12. The method according to claim 1, wherein the polishing bath has a sulfuric acid concentration of 40 to 75%.

13. The method according to claim 12, wherein the polishing bath has a hydrofluoric acid concentration of 3 to 10%.

14. The method according to claim 13, wherein the polishing bath has a temperature of at least 70° C.

15. The method according to claim 1, wherein the sulfuric acid washing bath has a concentration of more than 67% $H_2SO_4$.

16. The method according to claim 15, wherein the sulfuric acid washing bath has a concentration of 68 to 72% $H_2SO_4$.

17. The method according to claim 15, wherein the sulfuric acid washing bath has a temperature of 55° to 65° C.

18. The method according to claim 1, wherein the polishing bath has a density which is kept constant and is controllable by determining the hydrofluoric acid concentration in the polishing bath through conductivity measurements, thereby allowing an automatic control of the polishing bath on the basis of the measured value, by introducing hydrofluoric acid when a minimum concentration is obtained and by stopping the supply of hydrofluoric acid when a maximum concentration is achieved.

19. The method according to claim 18, wherein the conductivity measurement is continuously performed.

20. The method according to claim 18, wherein the conductivity measurement is intermittently performed.

* * * * *